United States Patent [19]
Granberg

[11] 3,815,229
[45] June 11, 1974

[54] HEDGE TRIMMER ATTACHMENT FOR A CHAIN SAW

[76] Inventor: Elof Granberg, 530 Canal St. 1a, San Rafael, Calif. 94901

[22] Filed: Oct. 9, 1970

[21] Appl. No.: 79,449

[52] U.S. Cl. .................................................. 30/388
[51] Int. Cl. ............................................ B27b 17/02
[58] Field of Search ...................... 30/144, 166, 167; 143/32 F

[56] References Cited
UNITED STATES PATENTS

| 2,642,901 | 6/1953 | Hayden | 30/167 |
| 2,698,034 | 12/1954 | Jakku | 30/167 |
| 2,832,136 | 4/1958 | Trecker | 30/167 |

FOREIGN PATENTS OR APPLICATIONS

| 1,042,282 | 9/1966 | Great Britain | 30/167 |

Primary Examiner—Theron E. Condon
Assistant Examiner—J. C. Peters
Attorney, Agent, or Firm—Bruce & McCoy

[57] ABSTRACT

A double-edged comb which can be removably secured to the cutter bar of a chain saw to convert the chain saw to a hedge trimmer.

4 Claims, 12 Drawing Figures

HEDGE TRIMMER ATTACHMENT FOR A CHAIN SAW

BACKGROUND OF THE INVENTION

The present invention relates to attachments for chain saws and more particularly to a hedge trimmer attachment which can be removably secured to the cutter bar of a chain saw.

The closest known prior art device similar to that of the present invention is disclosed in U.S. Pat. No. 2,642,901 for CLIPPER AND MOWER ATTACHMENT FOR CHAIN SAWS by E. A. Hayden issued June 23, 1953.

SUMMARY OF THE INVENTION

The present invention is an improvement in attachments for a chain saw having a cutter bar clamped to the chain saw drive unit. The improvement is a hedge trimmer attachment comprising: a double-edged comb which is removably securable along the cutter bar and has teeth which extend beyond the periphery of the cutting chain of the chain saw when the comb is secured to the cutter bar; the teeth of the comb are similarly beveled to pointed ends along first corresponding edges of each of the teeth and the teeth are provided with a straight edge along the second corresponding edges of the teeth which oppose the cutting effect of the saw chain.

It is therefore an important object of the present invention to provide a unitary removable hedge trimmer attachment for a chain saw;

It is another object of the present invention to provide a hedge trimmer attachment for a chain saw which effectively separates the hedge and holds the hedge for cutting by the chain saw;

It is a further object of the present invention to provide a hedge trimmer attachment for a chain saw which can be cheaply manufactured as a stamped sheet metal part;

It is yet another object of the present invention to provide a hedge trimmer attachment for a chain saw which can be secured to the cutter bar of the chain saw by simply loosening the cutter bar securing bolt to permit the end of the attachment to be slipped thereunder and by securing the other end of the attachment to the cutter bar by a single nut and bolt;

It is yet a further object of the present invention to provide a hedge trimmer attachment for a chain saw which can be secured to the cutter bar of the chain saw by two bolts;

It is still another object of the present invention to provide a hedge trimmer attachment for a chain saw which can be secured to the cutter bar of a chain saw by means of a hook which can be inserted in a slot in the cutter bar and by a single nut and bolt inserted through the attachment and the cutter bar;

And it is still a further object of the present invention to provide a chain saw hedge trimming attachment which is inexpensive, easy to manufacture, and can be adapted to fit a large variety of makes and sizes of chain saws.

DESCRIPTION OF THE PREFERRED EMBODIMENT

Figure 1:
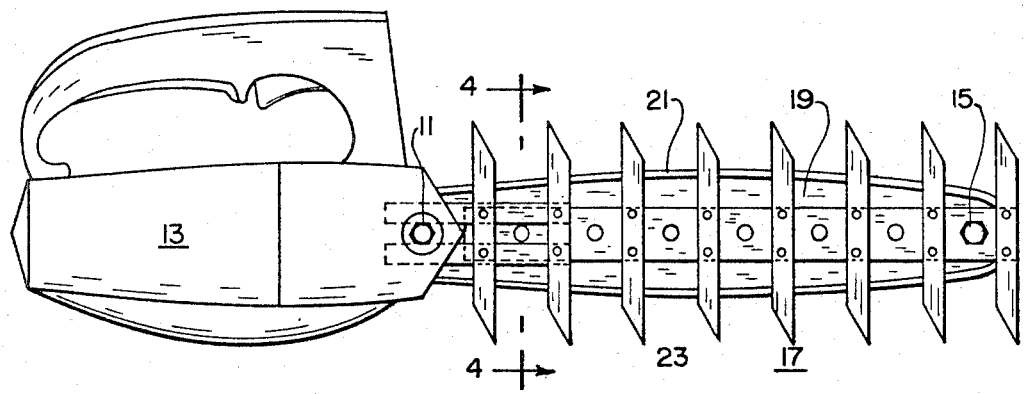
FIG. 1 of the drawings is a side elevation of the hedge trimmer attachment of the present invention secured to the cutter bar of a chain saw.
Figure 2:
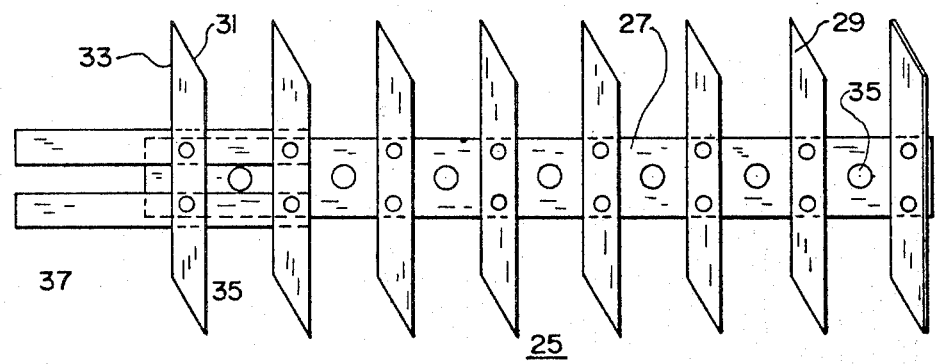
FIG. 2 is a side elevation of a preferred embodiment of the present invention.
Figure 3:
FIG. 3 is a top view of the preferred embodiment of FIG. 2.
Figure 4:
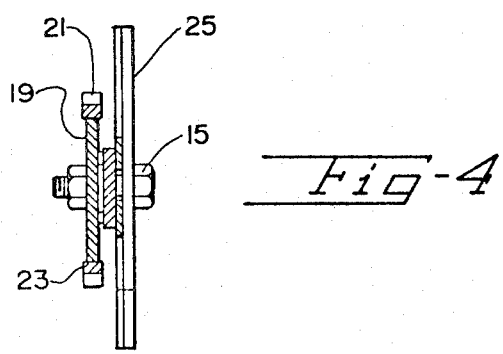
FIG. 4 is an end sectional view of FIG. 1 taken along lines 4—4.
Figure 5:
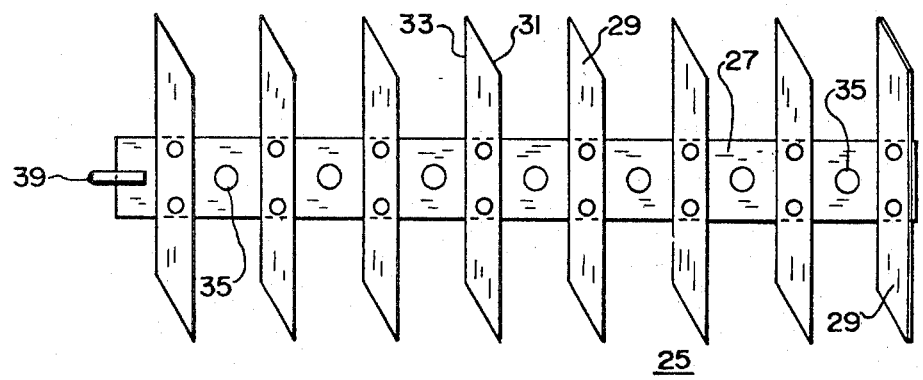
FIG. 5 is a side elevation of a second preferred embodiment of the present invention.
Figure 6:
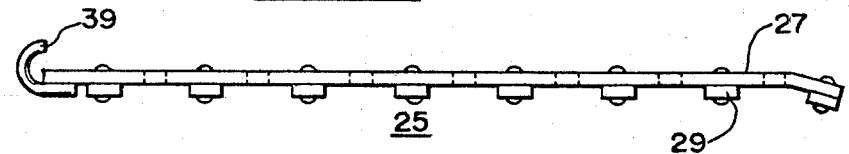
FIG. 6 is a top view of the preferred embodiment of FIG. 5.

The present invention is a device which permits gasoline driven chain saws, which are normally used for cutting wood, to also be used for trimming hedges or brush. It is a simple attachment as shown in FIG. 1 which, depending upon the type of chain saw it is to be used with, can be easily mounted thereon by simply loosening the main cutter bar bolt 11, slipping the attachment between the gripping faces of the chain saw drive unit 13, placing one bolt 15 through the attachment 17 and the cutter bar 19, and tightening the cutter bar securing bolt 11 and the bolt 15 holding the attachment to the cutter bar. The simple attachment thereby converts a useful and efficient cutting machine into a more effective and diversified tool which can be utilized for many additional purposes.

Almost all chain saws have a cutter bar 19 clamped into the chain saw drive unit 13. The cutter bar in most instances is clamped between a pair of opposing faces by a cutter bar securing bolt 11 which extends through the faces of the drive to tighten them against the cutter bar. The saw chain 21 is then driven within the drive unit and guided around the cutter bar by means of a track 23 formed on the periphery of the cutter bar.

The attachment comprises a double-edged comb 25 having a central flat backbone 27 and teeth 29 which are long enough to extend beyond the periphery of the saw chain. The backbone portion of the attachment is formed to be mounted directly against the cutter bar portion of the chain saw. The backbone of the comb can be formed of a long flat element to which the teeth can be secured, or the whole unit, backbone and teeth, can be formed of a single sheet metal stamping as shown in FIGS. 9–12.

The teeth are formed to extend beyond the periphery or cutting path of the saw chain and also are formed with either a curvature, or a spacing from the track of the saw chain, which prevents interference with the cutting action of the saw chain but yet permits the comb to be positioned closely adjacent to the saw chain to provide a stop or anvil surface to position and hold the hedge limbs which are to be cut by the saw chain.

Figure 10:
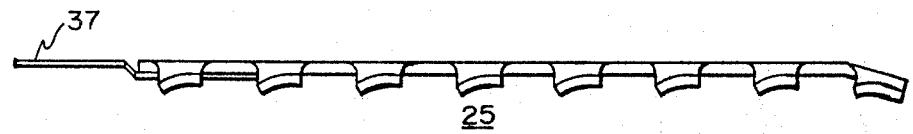
FIG. 10 is a top view of the preferred embodiment of FIG. 9.
Figure 11:
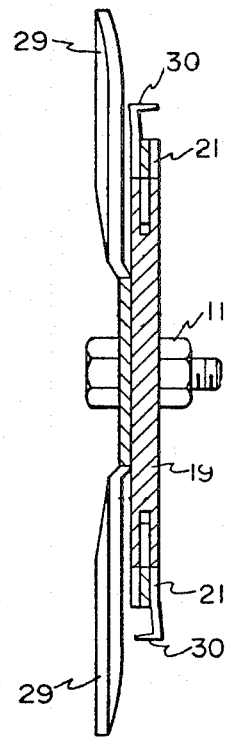
FIG. 11 is an end sectional view of FIG. 1 taken along lines 4—4 opposite the direction of the arrows but showing the embodiment of FIGS. 9 and 10.
Figure 12:
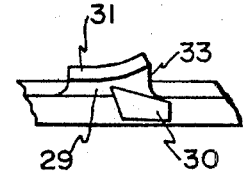
FIG. 12 is a top plan view of a saw chain cutting tooth proximate one of the teeth of the comb of FIG. 9.

The curvature of the teeth of the comb shown in FIGS. 10–12 guides the cutting teeth 30 of the saw chain so as to prevent the teeth of the chain from catching on the comb. A single saw chain tooth and one tooth of the comb are shown in FIG. 12 where the saw chain tooth is moving from right to left. If the saw chain tooth is not tracking accurately as it approaches the comb tooth, it will strike the fore of the comb tooth, which is inclined with respect to the track of the saw chain, and thereby guide the saw chain tooth back into an accurate saw chain track around the cutter bar.

The teeth of the attachment are similary beveled to pointed ends along the first corresponding edges 31 of each of the teeth. This means that each tooth is beveled on the same side and in a regular pattern. The terms "pointed ends" are simply descriptive of the preferred embodiment, but they can include rounded ends or any other configuration which will serve to separate the hedge on to both sides of the teeth when the attachment is pushed into the hedge.

The teeth of the attachment are also provided with a straight edge 33 along second corresponding edges of each of the teeth. These second edges are disposed on the side of the tooth which opposes the cutting effect of the saw chain. In other words, this is the edge against which the branch of the hedge will be forced by the cutting action of the saw chain.

Figure 7:
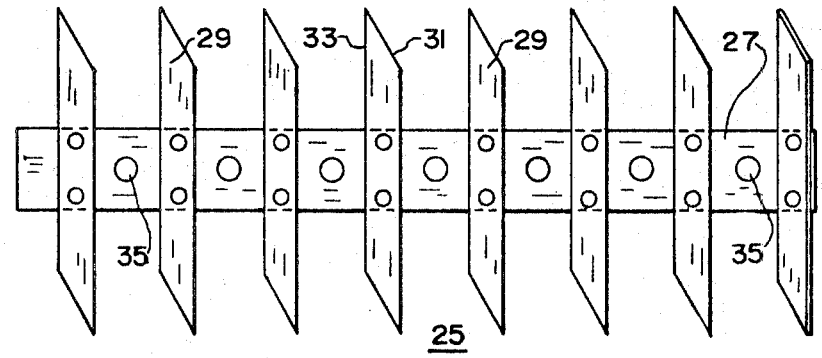
FIG. 7 is a side elevation of a third preferred embodiment of the present invention.
Figure 8:
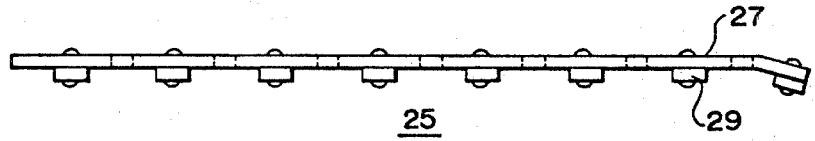
FIG. 8 is a top view of the preferred embodiment of FIG. 7.
Figure 9:
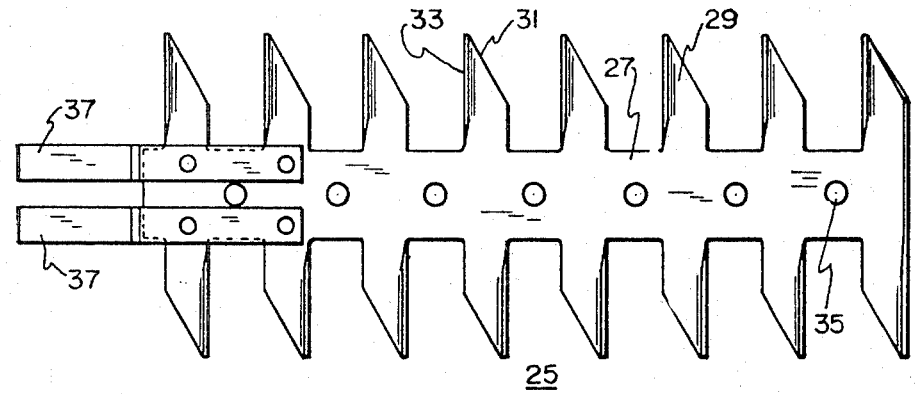
FIG. 9 is a side elevation of a fourth preferred embodiment of the present invention.

Means are provided for removably securing the comb to the cutter bar. The particular type of securing means depends upon the type and style of chain saw with which the attachment is to be used. The simplest means is shown in FIGS. 7 and 8 and includes two holes 35 drilled in the cutter bar proximate both ends thereof and aligned with similar holes 35 in the attachment. Two bolts hold the comb to the cutter bar.

However other securing means are available which lend themselves readily to the usual construction of most chain saws. The preferred includes a pair of spring metal projecting portions 37 which can be inserted alongside the cutter bar and clamped between the drive unit and the cutter bar 17 making it possible to attach the comb to any chain saw without drilling or modifying the saw or cutter bar. These projecting portions or prongs can either be separate pieces of metal secured to the cutter bar or a single piece which is provided with a slot for accommodating the cutter bar securing bolt and securely locating the attachment on the cutter bar with respect to the drive unit.

The further preferred embodiment can include a securing means which includes a hook member 39 at one end of the comb which engages a slot in the cutter bar 17. Most cutter bars are provided with such a slot which permits the cutter bar to be moved into or out of the drive unit to take up or provide slack in the saw chain. The slot that is formed in the cutter bar is convenient for receiving the hook at the end of the comb. In both of the embodiments utilizing either the hook or the projecting prongs which coact with either the drive unit or the cutter bar, the other end of the attachment is secured to the cutter bar 17 by means of a nut and bolt which is inserted through a hole in the cutter bar and an aligned hole in the attachment.

While the drawings of the preferred embodiment show a comb which has the teeth individually secured to the backbone of the comb, it has been determined that it is cheaper and easier to make the whole comb from a single stamped metal element as shown in FIGS. 9–12 and to attach thereto the two spring metal prongs described above.

The present invention provides a new and novel means for converting a simple chain saw into a very versatile tool which can also be used for hedge or brush trimming and which is particularly adapted to cutting heavy hedges which have thick branches. This device is able to cut hedges which heretofore have not been shapeable except by use of a saw and cutting one branch at a time. The invention is inexpensive to make, it easily converts a chain saw from a wood saw to a hedge trimmer; and it is an effective and useful improvement in chain saw attachments.

It will be apparent from the foregoing description of the invention in its preferred form that it will fulfill all the objects attributable thereto. While it has been illustrated and described in considerable detail, the protection is not to be limited to such details as have been illustrated and described except as may be necessitated by the appended claims.

I claim:

1. A hedge trimmer attachment for a chain saw having a cutter bar clamped to the chain saw drive unit, said attachment comprising
    a double-edged comb which can be removably secured along said cutter bar, the teeth of said comb extending beyond the periphery of the saw chain when said comb is secured to said cutter bar, and a hook member for engaging a slot in said cutter bar for removably securing said comb to said cutter bar.

2. The hedge trimmer attachment of claim 1 wherein said comb portion is a one piece stamped element.

3. A hedge trimmer attachment for a saw chain having
    a cutter bar clamped into the saw chain drive unit for supporting
    a saw chain, said attachment comprising
        a double-edged comb having a central backbone removably securable to said cutter bar and teeth extending beyond the periphery of said saw chain, said teeth being similarly beveled to pointed ends along the first corresponding edges of each of said teeth and provided with a straight edge along the second corresponding edges of said teeth which oppose the cutting effect of said chain, and
        a hook member for engaging a slot in said cutter bar and at least one pair of aligned holes in said cutter bar in said comb for permitting clamping means to be inserted therethrough, for removably securing said comb to said cutter bar.

4. A hedge trimmer attachment for a chain saw having a cutter bar clamped onto the chain saw drive unit for supporting a saw chain, said attachment comprising a double-edged comb having a central backbone removably securable to said cutter bar and teeth extending beyond the periphery of said saw chain on both sides of said cutter bar, said teeth being formed with a curvature away from the track of the chain saw for providing a space therebetween, and being similarly beveled to pointed ends along a first corresponding edge of each of said teeth and provided with a straight edge along a second corresponding edge of each of said teeth which opposes the cutting effect of the saw chain, a pair of projecting spring metal prongs secured to one end of said comb and which can be inserted alongside said cutter bar and clamped between said drive unit and said cutter bar, said prongs providing a locating slot therebetween for engaging the saw chain drive unit, and a pair of aligned holes in the other end of said comb and said cutter bar for permitting clamping means to be inserted therethrough.

* * * * *